April 12, 1949.  E. D. LILJA  2,466,716
CONDITION CONTROL APPARATUS WITH AUTOMATIC RESET
Filed Feb. 10, 1948
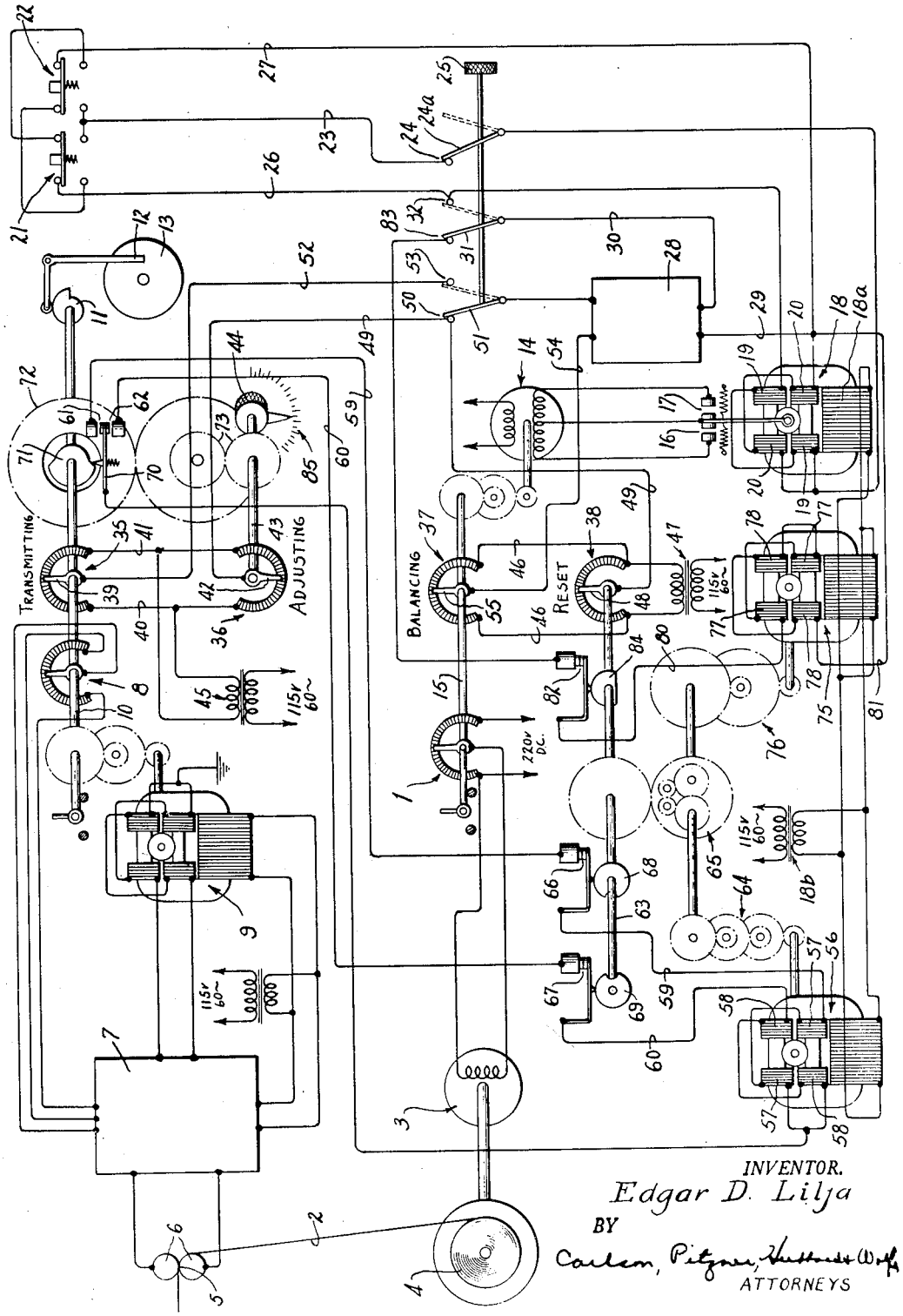
INVENTOR.
Edgar D. Lilja
BY
Carlsen, Pitzner, Hubbard & Wolf
ATTORNEYS Patented Apr. 12, 1949

2,466,716

UNITED STATES PATENT OFFICE 2,466,716

CONDITION CONTROL APPARATUS WITH AUTOMATIC RESET

Edgar D. Lilja, Rockford, Ill., assignor to Barber-Colman Company, Rockford, Ill., a corporation of Illinois Application February 10, 1948, Serial No. 7,511

13 Claims. (Cl. 318—29)

1

This invention relates to condition control apparatus having a normally balanced system incorporating a so-called resetting means for producing a further but slow adjustment of the condition regulator following a proportioning adjustment in response to a condition change whereby to always bring the controlled condition to a predetermined value or control point when the system is again in balance. Apparatus of this character may incorporate a means manually adjustable to vary the control point of the system as well as a mechanism also operable manually to adjust the condition regulator independently or the automatic control and prepare the entire system for proper operation as soon as the automatic control is again restored.

One object of the present invention is to provide apparatus of the above character incorporating a novel means operating automatically during manual readjustment of the apparatus to simultaneously readjust the resetting mechanism and leave the apparatus, when the readjustment is completed, conditioned for proper automatic operation to maintain the controlled condition at the newly selected value.

Another object is to control independent readjustment of the resetting mechanism in accordance with the balance and unbalance between the resetting and balancing devices of the automatic control system.

A further object is to effect the auxiliary adjustment of the resetting mechanism by a secondary motor operator.

Other objects and advantages will become apparent from the following detailed description taken in connection with the accompanying drawing, which is a schematic view and wiring diagram of an automatic condition regulating apparatus embodying the novel features of the present invention.

The invention is applicable to the control of various kinds of regulators such as valves, dampers, voltage adjusters, etc., for regulating a wide variety of physical, chemical or electrical conditions. For convenience of illustration, however, it is shown in the drawing incorporated in an apparatus for automatically adjusting a speed changer in the form of a voltage regulator 1 for governing the speed of advance of a traveling medium such as a thread or cloth web 2 through a drier (not shown) to maintain the moisture content at a constant value. It is to be understood that I do not intend to limit the invention to such typical use nor to the particular kind of control mechanism shown but aim to cover all modifications, alternative constructions and uses falling within the spirit and scope of the invention as expressed in the appended claims.

The condition regulator or speed changer 1 may, as shown, operate through the intermediary of an electric motor 3 which drives a roll 4 by which the thread or web 2 is advanced past a point 5 at which changes in the moisture content are sensed. For this purpose, opposite sides of the thread or web are contacted by roller electrodes 6 interposed in a measuring unit 7 comprising a conventional vacuum tube amplifier plus a direct current to alternating current inverter as shown in a copending application of Donald L. Hall, Serial No. 699,540, filed September 26, 1946. A control impulse or voltage is applied to the input of the measuring unit, this being in this instance the voltage drop across the web 2 which is proportional to changes in the controlled condition or moisture content. The output of the measuring unit operates in conjunction with a balancing potentiometer 8 to selectively energize the shading windings of a reversible electric motor 9 and cause a shaft 10 driven by the motor to be positioned angularly in accordance with the prevailing value of the moisture content of the web 2. The movable arm of the balancing potentiometer is fast on the shaft 10 which carries a cam 11 for moving a pen arm 12 across a chart 13 driven by a synchronous motor so as to produce a continuous indication and record of changes in the moisture content of the web.

The condition regulator 1 may be adjusted under manual control or automatically in accordance with deviations of the control condition from the value to be maintained. Both of these adjustments are effected in the present instance by an electric servo motor 14 operating through speed reduction gearing to drive a shaft 15 carrying the movable arm of the speed regulator 1. The direction and extent of operation of the motor 14 are controlled by switches 16 and 17 of a reversing motor relay 18 of the so-called shaded pole or two-phase type having a main winding 18ª constantly energized by alternating current from a source 18ᵇ. The arrangement is such that when coils 19 of the relay are active, the switch 16 is closed and the motor 14 runs in a direction to reduce the speed of the servo motor 3. Conversely, when the relay coils 20 are active, the switch 17 is closed and the speed of the motor 3 is increased. When both coils 19 and 20 are deenergized or energized to the same degree, the common switch contact becomes centered as shown, stopping the speed adjusting motor 14.

Manual control of the relay 18 is effected through double pole, double throw, push button switches 21 and 22 having terminals respectively connected by conductors 26 and 27 to the insulated terminals of the relay coils 19 and 20. The common switch terminals are connected to the common terminal of the relay coils 19 and 20 by a conductor 23 having interposed therein a switch 24 whose movable arm 24ª is actuated by turning of a knob 25.

By depressing the push button of the switch 22 when the switch 24 is closed as shown, the coils 19 are short circuited and the resulting closure of the relay switch 16 starts the motor 14 to move the regulator 1 in a direction to decrease the speed of the motor 3 and the drier. Reverse rotation of the condition regulator 3 takes place when the push button of the switch 21 is depressed.

Automatic control of the relay 18 to operate the motor 3 so as to maintain the control condition constant is effected in the present instance through the medium of an electrical network, the balance of which is upset by changes in the position of the shaft 10 and the voltage resulting from such unbalance is applied to an alternating current vacuum tube amplifier 28 having output terminals one of which is connected by a conductor 29 to the insulated terminal of the coils 20. The other terminal is connected to a conductor 30 leading to a switch arm 31 which cooperates with a contact 32 connected to the conductor 26 leading to the coils 19.

The amplifier 28 is of the conventional type consisting of a multi-grid tube acting as a voltage amplifier and resistance-capacitance coupled to a beam power tube for supplying electrical energy at the input frequency to the output circuit in which the relay coils 19 and 20 are connected in series when the switch 31, 32 is closed. The switch arm 31 is actuated by the knob 25 so that the switch is closed as shown in phantom when the switch 24 is opened and vice versa.

In the present instance, the electrical network above referred to is composed of four potentiometers 35, 36, 37 and 38, hereinafter referred to as the transmitting, adjusting, balancing, and reset potentiometers and interconnected to form two bridge circuits which in turn are interconnected to form the complete network. The transmitting potentiometer 35 responds to changes in the controlled condition and for this purpose its slider arm 39 is fast on the shaft 10 whose position at any time is, as described above, a measure of the prevailing value of the controlled condition. Opposite terminals of the resistance element of this potentiometer are respectively connected by conductors 40 and 41 to the opposite terminals of the resistance element of the adjusting potentiometer 36 whose slider 42 is on a shaft 43 which may be adjusted manually by turning a knob 44. The bridge thus formed is energized by connecting the conductors across an alternating current source 45 of the same frequency and phasing as the source 18ᵇ.

The second bridge circuit is formed in a similar way by connecting the resistance elements of the balancing and reset potentiometers 37 and 38 by conductors 46 connected across a similar alternating current source 47. To interconnect the two bridges and form the network for producing the amplifier input, the sliders 42 and 48 of the adjusting and reset potentiometers 36 and 38 are connected by a conductor 49 which, for a purpose to appear later, includes a contact 50 engageable by a switch arm 51 as shown when the knob 25 is in the "manual" control position. This arm is connected to one input terminal of the amplifier 28. The slider 39 of the transmitting potentiometer 35 is connected by a conductor 52 to a contact 53 which is engaged by the switch arm 51 when the knob 25 is in the "automatic" control position as shown in phantom, the slider 39 then being connected to the input terminal of the amplifier. The other input terminal is connected by a conductor 54 to the slider 55 of the balancing potentiometer 37.

To obtain a resetting action, that is, further but slow adjustment of the condition regulator 1 until the desired condition value has actually been attained in the web 2, the slider 48 is shifted slowly in one direction or the other so long as the shaft 10 departs from a position corresponding to the desired condition value. Herein, this adjustment of the slider is effected by an alternating current motor 56 similar to the motor of the relay 18 and having its shaft coupled to a shaft 63 carrying the slider 48. The coupling extends through a speed-reduction gearing 64 for producing the desired slow speed of adjustment to one terminal gear of a differential 65 whose intermediate gear meshes with a gear on the shaft 63.

The shading windings 57 and 58 have insulated terminals respectively connected to the insulated contacts of two switches 61 and 62 by conductors 59 and 60 having normally closed limit switches 66 and 67 interposed therein and respectively opened at opposite limit positions of the shaft 63 by cams 68 and 69. The common contact of the switches 61 and 62 is carried by an arm 70 constituting the follower of a cam 71 on the transmitting shaft 10. The follower engages the midpoint on the cam rise when the controlled condition as evidenced by the position of the shaft 10 is at the desired value, both switches 61 and 62 then being open. Turning of the shaft in either direction in response to a detected condition deviation, closes one of the switches so as to short-circuit the corresponding motor windings 57 or 58.

The switch arm 70 and the cooperating contacts of the switches 61 and 62 are mounted on the side of a disk 72 which is loose on the shaft 10 so that the position of the shaft at which the follower 70 is engaged to hold both of the switches open may be shifted around the shaft, thereby adjusting the resetting mechanism for the maintenance of different values of the controlled condition. If desired, this adjustment may be effected in unison with the manual adjustment of the potentiometer 36. For this purpose, disk 72 is made as a gear and coupled by gearing 73 to the adjusting shaft 43.

In operation of the automatic control, the switch arms 24ª, 31 and 51 would be in the phantom positions and the various parts would be positioned as shown when the system is in balance, the controlled condition or moisture content of the web then being at the desired value predetermined by the setting of the adjusting knob 44. At this time, no voltage will be fed to the amplifier or applied to the four of the series connected coils 19 and 20 of the relay 18. As a result, the relay switches 16 and 17 remain open and the regulator 1 maintains the capacity of the conditioning apparatus constant.

Now, if the moisture content of the web 2 passing the point 5 changes, the slider 39 will be shifted proportionally thereby upsetting the balance of the network by a corresponding amount. Voltage of a magnitude determined by this condition deviation and phased according to the direction of the deviation will be magnified by the amplifier 28 and applied to the coils 19 and 20. In view of the phase relationship between this voltage and that applied to the relay winding 18ª, the proper relay switch 16 or 17 will be closed thereby starting the motor 14 and the regulator 1 in a direction to change the speed of the motor 3 and correct for the condition deviation. This action continues until the balance of the network has been restored by the accompanying adjustment of the balancing potentiometer. At the same time and throughout the persistence of the condition deviation, a corresponding one of the resetting control switches 61, 62 will be closed whereby to run the slow resetting motor 56 and through the potentiometer 38 upset the balance of the network slowly so as to produce a further corrective adjustment of the conditioner and an accompanying balancing adjustment of the potentiometer 37. Finally, when the predetermined value of the condition has been restored, the resetting switch will be opened and the network balance attained.

Frequently, it becomes desirable to manually adjust the automatic control system for the maintenance of a different value of the controlled condition. This is accomplished by first turning the knob 25 to position the switch arms 24ª, 31 and 51 as shown in full, thereby disabling the automatic control and rendering the manual control switches 21 and 22 operative. The operator next turns the knob 44 to a previously calibrated position indicated on a scale 85 and corresponding to the new moisture content to be maintained. Then, by manipulating one or both of the push button switches 21 and 22 while at the same time observing the prevailing moisture content indicated by the recorder pen 12, the regulator 1 is adjusted in the manner above described to change the speed of the motor 3 until the newly selected moisture content value is attained and indicated on the recorder.

Before restoration of the automatic control following such manually controlled readjustment of the conditioning apparatus, it is desirable to readjust the resetting potentiometer 38 to correspond to the new control point. This avoids the delay and the false operation of the control which would otherwise take place in restoring proper operation of the resetting mechanism at the new control point.

In accordance with the present invention such readjustment of the resetting mechanism is effected automatically without attention by the attendant and preferably during the manual readjustment of the conditioning apparatus. To this end, the potentiometer slider is adapted to be motor driven at a higher speed than in the normal resetting action. While this may be accomplished by adapting the motor 56 for operation at two speeds, it is preferred to employ a second electric motor 75 arranged to drive the potentiometer slider 48 through gearing 76 of substantially lesser reduction ratio than the gearing 64 so that the motion of the slider 48 may closely follow the movements of the balancing slider 55 during the manually controlled readjusting operation. The gearing 76 drives the other terminal gear of the differential 65 so that the potentiometer may be adjusted at the fast rate while the motor 56 remains idle.

As is the case of the relay 18, the motor 75 is of the two phase shaded pole reversible type having a main winding energized from the same alternating current source and coils 77 and 78 connected in series so as to cause operation of the motor in one direction or the other according to the phase angle of the voltage applied to the coils in relation to the main field voltage. Accordingly, the amplifier 28 may be utilized to control the operation of the motor 75 in the same manner that the relay 18 is controlled during operation of the automatic control system. Thus, one terminal of the series connected coils 77, 78 is connected by a conductor 81 to the output conductor 29 of the amplifier 28 while the other terminal is connected to a conductor 80 leading through a safety switch 82 to a contact 83. When the knob 25 is in the "manual" position, this contact is engaged by the switch arm 31 and thus connected to the other output terminal of the amplifier. The switch 82 is normally held closed by a cam 84 on the shaft 63 but is opened to stop the motor 75 if the resetting slider 48 tends to run beyond either end of the associated resistance element.

To maintain the resetting slider 48 in step with the balancing slider 55 during manually controlled readjustment of the apparatus, the bridge circuit formed by the potentiometers 37 and 38 alone is utilized to energize the amplifier. For this purpose, it is only necessary to connect the slider 48 to the second input terminal of the amplifier by turning of the knob 25 from the "automatic" to the manual position. This moves the switch arm 51 away from the contact 53 into engagement with the contact 50.

With the parts positioned as shown in full, the rapid resetting motor 75 operates in the following manner during manipulation of the switches 21 and 22 to readjust the conditioning apparatus to the newly selected control point. If the push button switch 22 is depressed for the purpose of slowing down drier motor 3 so as to increase the drying effect on the web 2, the relay coils 19 will be energized and the motor 14 will run in a direction to turn the shaft 15 counterclockwise. Such turning of the slider 55 of the balancing potentiometer upsets the balance of the bridge then formed by the potentiometers 37 and 38 and then associated with the amplifier. The voltage thus fed to the amplifier energizes the windings 77 and 78 of the motor 75. The phase of this voltage is in this case such as to cause the motor to run in a direction to turn the slider 48 of the reset potentiometer counterclockwise so as to follow the motion of the balancing slider 55. This action continues so long as the balancing slider continues to turn and, after release of the switch 22, until the bridge circuit has been rebalanced at which time the sliders 48 and 55 will be in positional agreement. The slider 48 will then be positioned correctly according to the new settings of the transmitting and adjusting potentiometers 35 and 36 so that the bridge network formed by all four potentiometers 35 to 38 will be substantially in balance when the automatic control is again restored by turning the knob 25 to the "automatic" position. By properly correlating the speed of the drive of the shaft 63 by the motor 75 as compared to the speed of the drive of the shaft 15 by the motor 14, the reset slider may be made to follow closely the movements of the slider 55 so that the readjustment of the reset slider will be completed substantially simultaneously with the manually controlled readjustment of the transmitting potentiometer 35 incident to bringing the moisture content of the web 2 to the new control point selected by adjustment of the adjusting potentiometer 36.

Reverse operation of the faster reset motor 75 takes place in the same way when the moisture content of the web 2 is being increased by manual depression of the switch 21 following adjustment of the knob 44 to set the potentiometer 36 and the reset control switches 61, 62 for a higher control point. In such a case, the relay coils 20 are energized by the switch 21, and the motor 14 operates to turn the balancing slider 55 clockwise. This results in a voltage opposite in phase from the previous example being applied by the amplifier to the windings 77 and 78 and a consequent reversal in the direction of operation of the motor 75. The slider 48 thus turns clockwise and follows the motion of the balancing slider 55.

From the foregoing, it will be seen that the manipulations required in order to change the control point of the automatic control system to a new value are relatively few and may be effected without special skill. Thus, a new control point is selected by adjusting the knob 44 to a position indicated on the scale 85 corresponding to the new condition value desired. Then, with the knob 25 shifted to the "manual" position, it is only necessary for the attendant to hold the proper one of the push button switches 21 and 22 depressed and thereby change the capacity of the conditioning apparatus in the proper direction until the newly selected condition value is actually attained. As an incident to this, all of the other necessary adjustments of the automatic control system will be made automatically without attention on the part of the operator and the system will be adjusted for proper functioning as soon as the automatic control is restored by turning the knob 25 back to the "automatic" position.

I claim as my invention:

1. Condition regulating apparatus having, in combination, a regulator, a reversing motor actuator therefor, a first potentiometer having a movable element adapted for adjustment in opposite directions from a predetermined position according to deviations of a condition to be controlled from a predetermined value, a second potentiometer having a manually adjustable element, a third potentiometer having an adjustable element movable with said regulator, a fourth potentiometer having an adjustable element, means including a slow-acting reversible resetting motor operator for adjusting said fourth element automatically in accordance with deviations of said first element from said predetermined position, means connecting said first and second potentiometers to form a resistance bridge, means connecting said third and fourth potentiometers to form a second resistance bridge, means joining said two bridges to form a double bridge network, means responsive to unbalance of said network in either direction in response to movement of said first element to energize said motor actuator and cause movement of said regulator and said third element in a direction to rebalance the network, manually operable switching means for disconnecting said two bridges and manually controlling said motor actuator to adjust said regulator independently of said network, a second motor operator for adjusting said fourth element at a speed substantially greater than said slow-acting motor, and means automatically operable in response to unbalancing of said second bridge by said actuator during manual adjustment of the latter to energize said second motor operator and cause movement of said fourth element in a direction to rebalance the second bridge.

2. Condition regulating apparatus having, in combination, a regulator, a reversing motor actuator therefor, a first potentiometer adjustable in opposite directions from a predetermined position according to deviations of a condition to be controlled from a predetermined value, a second potentiometer, a third potentiometer adjustable in unison with the movements of said regulator, a fourth potentiometer, means including a slow-acting reversible resetting motor operator for adjusting said fourth potentiometer automatically in accordance with deviations of said condition from said predetermined value, means connecting said first and second potentiometers to form a resistance bridge, means connecting said third and fourth potentiometers to form a second resistance bridge, means joining said two bridges to form a double bridge network, means responsive to unbalance of said network in either direction to energize said motor actuator and cause movement of said regulator and adjustment of said third potentiometer to rebalance the network, manually operable switching means for disconnecting said two bridges and manually controlling said motor actuator to adjust said regulator independently of said network, a second motor operator for adjusting said fourth potentiometer, and means automatically operable in response to unbalancing of said second bridge by said actuator during manual adjustment of the latter to energize said second motor operator and cause adjustment of said fourth potentiometer in a direction to rebalance said second bridge.

3. Condition regulating apparatus having, in combination, a regulator, a reversing motor actuator therefor, a first potentiometer movable in accordance with deviations of a condition to be controlled from a predetermined value, a second potentiometer manually adjustable, a balancing potentiometer actuated in unison with said regulator, a resetting potentiometer, means including a slow acting reversible resetting motor operator for adjusting said fourth element to cause restoration of the controlled condition to said predetermined value, means connecting said first and second potentiometers to form a resistance bridge, means connecting said balancing and resetting potentiometers to form a second resistance bridge, means joining said two bridges to form a network, means responsive to unbalance of said network in either direction in response to movement of said first element to energize said motor actuator and cause actuation of said regulator and said balancing potentiometer to rebalance the network, manually operable switching means for disconnecting said two bridges and manually controlling said motor actuator to adjust said regulator independently of said network, and mechanism automatically operable during said manually controlled operation of said actuator to actuate said resetting potentiometer and preserve the balance of said second bridge.

4. Apparatus for adjusting a regulator to maintain a condition to be controlled at a predetermined value having, in combination, a reversible motor actuator for moving said regulator back and forth, a normally balanced system including a control part adapted for adjustment with changes in said condition, a member movable with said regulator and operable by said actuator to rebalance said system following the detection of a condition change, resetting means operable in accordance with deviations of said condition from said predetermined value to modify said system and cause operation of said actuator to restore said predetermined condition value, manually operable means for adjusting the control point of said system, an electric motor for adjusting said resetting means independently, mechanism manually operable independently of said system to operate said actuator and through said regulator bring the condition to a value corresponding to a change in the setting of said manually operable means, and means operable during said manually controlled operation of said motor actuator to adjust said resetting means and maintain a condition of balance between the resetting means and said balancing member whereby said system is in balance when said manually controlled operation is terminated.

5. Apparatus for adjusting a regulator to maintain a condition to be controlled at a predetermined value having, in combination, a reversible motor actuator for moving said regulator back and forth, a normally balanced system adapted to be unbalanced by changes in said condition, a member movable with said regulator and operable by said actuator to rebalance said system following the detection of a condition change, resetting means having an element movable in accordance with deviations of said condition from said predetermined value to modify said system and cause operation of said actuator to restore said predetermined condition value, manually operable means for adjusting the control point of said system, an electric motor for adjusting said resetting means independently, mechanism manually operable independently of said system to operate said actuator and through said regulator bring the condition to a value corresponding to a change in the setting of said manually operable means, and mechanism automatically operable during said manually controlled operation of said actuator to maintain said movable element in positional agreement with said movable member.

6. A system for adjusting a regulator to maintain a condition to be controlled at a predetermined value having, in combination, a part adapted for adjustment with changes in said condition, a reversible motor actuator for moving said regulator back and forth, a normally balanced system unbalanced by changes in the position of said part and operable to initiate operation of said actuator in a direction to rebalance the system, resetting means including a slow-acting motor responsive to deviations of said part from a predetermined position to unbalance said system and cause further operation of said actuator to restore the predetermined value of said condition, manually adjustable means for changing the control point of said system, a second electric motor for independently adjusting said resetting means at a higher rate than said first motor, means manually operable independently of said system to operate said motor actuator and through said regulator bring the condition to a value corresponding to a changed setting of said manually adjustable means, and means operable automatically during said manually controlled operation of said motor actuator to energize said second electric motor and maintain a substantially balanced condition of said system.

7. Apparatus for adjusting a regulator to maintain a condition to be controlled at a predetermined value having, in combination, a reversible motor actuator for moving said regulator back and forth, a normally balanced system including a control part responsive to changes in said condition, a member movable with said regulator and operable by said actuator to rebalance said system following the detection of a condition change, resetting means operable automatically to modify said system and cause operation of said actuator to restore said predetermined condition value, manually operable means for adjusting the control point of said system, a reversible electric motor operator for actuating said resetting means at different speeds, mechanism manually operable independently of said system to operate said actuator and through said regulator bring the condition to a value corresponding to a change in the setting of said manually operable means, and means operable during said manually controlled operation of said motor actuator to cause operation of said resetting operator at the higher of said speeds to adjust said resetting means to correspond to the readjustment of said balancing member whereby said system is substantially balanced when said manually controlled operation is terminated.

8. Condition regulating apparatus having, in combination, a regulator, a reversing motor actuator therefor, a first potentiometer having a movable element adapted for adjustment in opposite directions from a predetermined position according to deviations of a condition to be controlled from a predetermined value, a second potentiometer having a manually adjustable element, a third potentiometer having an adjustable element movable with said regulator, a fourth potentiometer having an adjustable element, means including a slow-acting reversible resetting motor operator for adjusting said fourth element automatically in accordance with deviations of said first movable element from said predetermined position, means connecting said first and second potentiometers to form a resistance bridge, means connecting said third and fourth potentiometers to form a second resistance bridge, means joining said two bridges to form a double bridge network, an electronic amplifier, switching mechanism selectively operable to apply to the input of said amplifier either the voltage output of said network as a whole or the voltage output of said second bridge, a second switching mechanism selectively operable to apply the amplifier output either to said motor actuator or to said second operator, and manually operable means by which said switching mechanisms may be actuated in unison to associate said amplifier with said network and said actuator or with said second bridge and said second operator.

9. Condition regulating apparatus having, in combination, a regulator, a reversing motor actuator therefor, a first potentiometer adjustable according to deviations of a condition to be controlled from a predetermined value, a manually adjustable potentiometer, a balancing potentiometer adjusted in unison with the movements of said regulator, a fourth potentiometer, a slow-acting reversible resetting motor operator for adjusting said fourth potentiometer automatically in accordance with deviations of said condition from said predetermined value, means connecting said first and second potentiometers to form a resistance bridge, means connecting said third and fourth potentiometers to form a second resistance bridge, means joining said two bridges to form a double bridge network, an electronic amplifier, switching mechanism selectively operable to apply to the input of said amplifier either the voltage output of said network as a whole or the voltage output of said second bridge, and a second switching mechanism selectively operable to apply the amplifier output either to said motor actuator or to said second operator.

10. Condition regulating apparatus having, in combination, a balanceable network responsive to changes in a condition to be controlled and having a movable balancing member and a movable resetting element, manually operable means by which said network may be adjusted for the maintenance of a different condition value, two reversible electric motor operators for driving said resetting element at slow and relatively higher speeds, said slow speed operator being active during normal operation of said network, and mechanism operable automatically during readjustment of the control point of said network by said manually operable means to energize said higher speed operator and cause said element to follow said balancing member.

11. Condition regulating apparatus having, in combination, a balanceable network responsive to changes in a condition to be controlled and having a movable balancing member and a movable resetting element, manually operable means by which said network may be adjusted for the maintenance of a different condition value, a reversible power operator for moving said resetting element at a slow speed during operation of said network or at a high speed, and mechanism operable automatically as an incident to adjustment of the network by said manually operable means to energize said operator for high speed operation and maintain substantial positional agreement between said element and said member.

12. Condition regulating apparatus having, in combination, a network which is balanced when a predetermined value of a controlled condition is attained, mechanism controlled by said network in response to unbalancing thereof by a condition change to produce a condition correcting action, said mechanism including a member movable to rebalance said network and a resetting element, a power operator for actuating said resetting element at a relatively low speed to modify the balance of said network until said predetermined condition value has been restored, said operator also being operable to drive said element at a substantially higher speed, manually controllable means by which said network and the regulating apparatus may be adjusted for the maintenance of a different condition value, and mechanism operable automatically during said manual readjustment to energize said operator for said higher speed operation and cause said resetting element to follow the position changes of said balancing member.

13. Apparatus for adjusting a condition regulator having, in combination, an automatic control system responsive to deviations of a condition to be controlled from a predetermined value and operable automatically to adjust said regulator to correct for such deviations, said system including a slow-acting resetting element, manually operable means for adjusting said regulator to a position corresponding to a newly selected control point of said system, and mechanism operable automatically during said readjustment to readjust said resetting element to a position corresponding to the newly selected control point of the system.

EDGAR D. LILJA.

No references cited.